C. A. SMITH.
Plant Irrigator and Propagator.
No. 214,263.   Patented April 15, 1879.
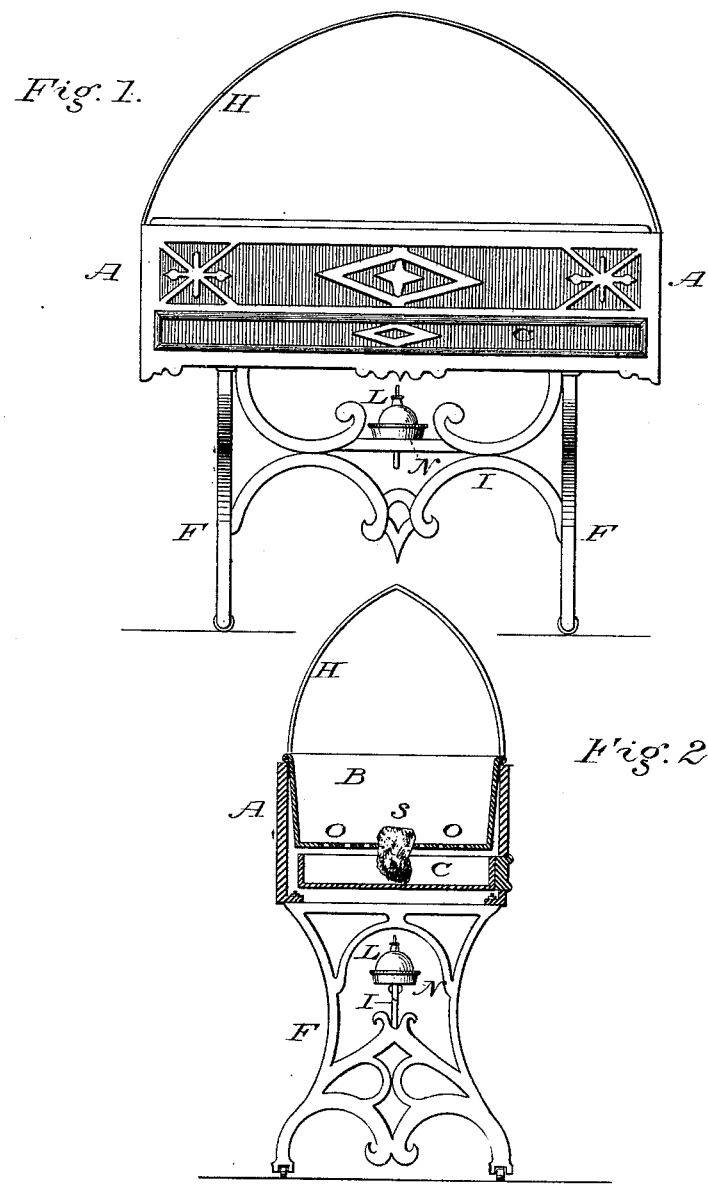

UNITED STATES PATENT OFFICE.

CHARLES A. SMITH, OF TOLEDO, OHIO.

IMPROVEMENT IN PLANT IRRIGATOR AND PROPAGATOR.

Specification forming part of Letters Patent No. 214,263, dated April 15, 1879; application filed November 14, 1878.

*To all whom it may concern:*

Be it known that I, CHARLES A. SMITH, of the city of Toledo, county of Lucas and State of Ohio, have invented a new and useful Improvement in Plant Irrigator and Propagator, of which the following is a specification.

The invention relates to the irrigation and propagation of plants for house and lawn purposes.

The object of my invention is to do away with pots, jars, and other cumbersome devices, with their accompanying stands, and to construct an ornamental device by which plants may be more easily propagated and perfectly grown at the expense of much less time and care, and which at the same time shall be much more cleanly for parlor and household purposes.

The invention consists in the arrangement of a frame supported upon feet, composed of metal or other suitable material, on which is arranged a receptacle for the earth, in which seeds or plants are embedded. The bottom of said receptacle is perforated for drainage. Underneath said receptacle is arranged a reservoir for water, connected by means of sponges or other porous substance with the earth above. Underneath the reservoir is a shelf or stand for the reception of a lamp or other suitable device for heating purposes. Above the frame, and supported by it, is an arch or trellis, formed of wire or other suitable material, for the support of climbing plants, and for the support of a canopy of cloth or other suitable material, whereby the heat may be retained, and more fully utilized for forcing the growth of plants or protecting them from freezing.

The more particular construction of my invention may be better understood by reference to the drawings and description of the same, in which—

Figure 1 represents a front elevation of the device. Fig. 2 is a vertical cross-section of the device, like letters designating like parts in each.

A represents a frame constructed of metal or other suitable material, in which C is a drawer forming a reservoir for water, which frame is supported by feet F F, or other suitable means, connected together by bracket I, which serves as support to frame A. L is a lamp, supported on stand or shelf N, attached to bracket I, for heating purposes.

B is a box, constructed of metal or other suitable material, for the reception of earth and plants, placed within frame A, the bottom of which box is arranged with apertures O O for the purposes of drainage. S S are sponges or other porous material connecting box B and reservoir C.

H is an arch or trellis, made of wire or other suitable material, attached to frame A, for the support of climbing plants, and over which a canopy of cloth or other suitable material may be placed for the retention of the heat produced by lamp L.

What I claim, and desire to secure by Letters Patent, is—

In an irrigator and propagator for plants, the combination of frame A, feet F F, bracket I, shelf N, and trellis H with box B, sponges S S, reservoir C, and lamp L, all substantially as and for the purposes specified.

CHARLES A. SMITH.

In presence of—
   A. C. BARLOW,
   J. T. GREER.